US011945236B2

(12) United States Patent
Mansutti

(10) Patent No.: US 11,945,236 B2
(45) Date of Patent: Apr. 2, 2024

(54) PORTABLE THERMAL PRINTER OF THE CLAMSHELL TYPE AND HANDHELD MULTIFUNCTION ELECTRONIC DEVICE WITH SAID PRINTER INTEGRATED THEREIN

(71) Applicant: 4P Srl, Padua (IT)

(72) Inventor: Silvano Mansutti, Padua (IT)

( * ) Notice: Subject to any disclaimer, the term of this patent is extended or adjusted under 35 U.S.C. 154(b) by 77 days.

(21) Appl. No.: 17/758,698

(22) PCT Filed: Jan. 15, 2021

(86) PCT No.: PCT/IB2021/050284

§ 371 (c)(1),
(2) Date: Jul. 13, 2022

(87) PCT Pub. No.: WO2021/144745

PCT Pub. Date: Jul. 22, 2021

(65) Prior Publication Data

US 2023/0056611 A1 Feb. 23, 2023

(30) Foreign Application Priority Data

Jan. 16, 2020 (IT) ........................ 102020000000730

(51) Int. Cl.
*B41J 29/13* (2006.01)
*B41J 3/36* (2006.01)
*B41J 15/04* (2006.01)

(52) U.S. Cl.
CPC .................................... *B41J 29/13* (2013.01); *B41J 3/36* (2013.01)

(58) Field of Classification Search
CPC ............. B41J 3/36; B41J 29/13; B41J 15/042
See application file for complete search history.

(56) References Cited

U.S. PATENT DOCUMENTS

| | | | | |
|---|---|---|---|---|
| 7,806,610 | B2 | 10/2010 | Nelson et al. | |
| 9,393,814 | B2 | 7/2016 | Aizawa | |
| 2016/0052319 | A1* | 2/2016 | Katayama | B41J 29/13 347/222 |
| 2017/0087902 | A1 | 3/2017 | Nakayama | |

FOREIGN PATENT DOCUMENTS

| | | | | |
|---|---|---|---|---|
| CN | 105015196 | A * | 11/2015 | B41J 11/04 |
| EP | 2193926 | | 6/2010 | |
| EP | 2193926 | A1 * | 6/2010 | B41J 11/006 |

OTHER PUBLICATIONS

Chen, MachineTranslationofCN-105015196-A, 2015 (Year: 2015).*
Takabatake, Machine TranslationofEP-2193926-A1, 2010 (Year: 2010).*

* cited by examiner

*Primary Examiner* — Scott A Richmond
(74) *Attorney, Agent, or Firm* — Themis Law

(57) ABSTRACT

A portable thermal printer, configured to be stand-alone or integrated in a handheld multifunction device, includes a printing mechanism having a paper pressing roller positioned in proximity to a paper output opening or slot with reversible constraint member, and a mechanism for the release of the paper pressing roller, the reversible constraint member being configured to engage a rotation pin of the paper pressing roller. The insertion/extraction of the rotation pin in/from the constraint member is performed by translating the paper pressing roller in an exit direction lying on an exit plane, and the release mechanism is configured to exert a force on the paper pressing roller in a direction parallel to the exit direction.

10 Claims, 3 Drawing Sheets

PORTABLE THERMAL PRINTER OF THE CLAMSHELL TYPE AND HANDHELD MULTIFUNCTION ELECTRONIC DEVICE WITH SAID PRINTER INTEGRATED THEREIN

The present patent concerns portable thermal printers and handheld multifunction electronic processors, and more specifically it concerns a new portable thermal printer, of the type commonly called “clamshell printer”, and a new handheld multifunction electronic device with said printer integrated therein.

Integrated thermal printers of the type commonly called “clamshell printer” are known, which comprise a casing or shell inside which a paper compartment is defined, that is, a compartment intended to contain at least one roll of printer paper and containing the printing mechanisms and at least one paper pressing roller positioned in proximity to said printing mechanisms and to the printed paper output slot.

The printing mechanisms usually comprise also a system consisting of springs and fixing elements which keep the paper pressing roller in the correct position.

Said shell furthermore comprises an access opening, wherein a cover that can be opened and is hinged to the shell is installed at the level of said opening. The known printers are usually provided with a system of levers configured to extract the roller from the fixing elements which hold it, wherein said levers usually extract the roller by exerting on the latter a force that is tangential with respect to the rotation direction of the cover, in such a way as to force it open. Said levers are positioned on the opening cover of the printer.

The main drawbacks of this solution are the following: a) it is impossible to use the cover to position other parts such as, for example, a display or a keyboard; b) a considerable effort is required of the operator to open the printer; c) there is the risk of the cover opening accidentally in case of impacts.

In other known printers, the paper pressing roller is fixed to the cover that closes the paper compartment; the roller is inserted in its operating position by closing the cover with a certain pressure and is released when the same cover is opened by pulling to opposite lateral elements.

The drawbacks of this solution are the following: a) low resistance to accidental opening in case of impacts, which worsens in the case b) where other parts, such as displays and keyboards, are applied to the cover and rest thereon with their additional weight; c) consequent increased wear of the coupling teeth of the paper pressing roller. Said printers can be of the stand-alone type or can be integrated or in any case fixed in handheld multifunction devices.

Portable handheld electronic processors are known, that is, processors having limited dimensions and weight, such as to make them suited to be held with one hand and to be used exclusively as portable devices.

Said handheld electronic processors generally comprise a plurality of peripheral units integrated in a single box-shaped body, such as data displays, keyboards for entering data, CPUs, operating memories and mass storage units and at least one keyboard of the type described above.

According to the intended use of the electronic device, it may also comprise further integrated accessories. For example, the known electronic devices designed for the management of payments made with credit cards and/or debit cards (cashless) comprise also an interface for microchip cards, contactless or not, and a display or an area of a touch screen display for entering personal identification numbers or for signing when paying with a card.

Handheld electronic devices are also known which on their back are provided with a second unit with display and keyboard, or a touch screen, exclusively for managing electronic payments with contact or contactless magnetic cards and/or microchip cards. Table electronic devices are also known, which are provided with two displays positioned frontally and having considerable dimensions and weight, so that they cannot be used as mobile devices like handheld computers.

The known document EP 2193926 B1 concerns a printer of the “clamshell” type comprising a containment shell that defines a compartment housing a roll of paper. The shell has a hinged cover which can be rotated between an open position and a closed position. A printing mechanism is installed in said shell and comprises a paper pressing roller positioned and held through reversible constraint means. In particular, the ends of the roller shaft are housed in an L-shaped groove created on the shell. Furthermore, the document describes a release mechanism which serves to release the shaft of the paper pressing roller. Said release mechanism is a lever which rotates with respect to the cover to release the paper pressing roller.

The known document U.S. Pat. No. 7,806,610B2 concerns a printer with a containment shell and a door to which a paper pressing roller is constrained. The door is provided with a release lever whose rotation with respect to the door itself causes the sliding movement of an element which in turn causes the door to open, forcing the shaft of the paper pressing roller out of the engagement notches provided on the shell. Said release lever is positioned at the centre of the cover, thus giving origin to the drawbacks described above, that is, the impossibility to use the cover to position other parts such as a display or a keyboard and the risk of the cover and the release mechanism opening accidentally in case of impacts.

The present invention concerns a new portable thermal printer of the type commonly called “clamshell printer” and a new handheld multifunction electronic device with said printer integrated therein.

It is the main object of the present invention to simplify and speed up paper replacement operations by automating the opening of the cover and the release of the paper pressing roller while leaving the external area of the printer’s closing cover free. It is another important object of the present invention to guarantee the closing of the door, preventing any accidental and undesired opening of the same.

It is an object of the invention to provide a new handheld electronic device which integrates several functions and is therefore more comfortable to use.

These and other direct and complementary objects are achieved by the new thermal printer of the clamshell type, comprising the following among its main parts:

- a containment shell, inside which the following is defined: a compartment suited to house at least one paper roll, an opening for accessing said paper compartment, a paper output opening or slot;
- a cover which is suited to close said opening giving access to the paper compartment and is directly or indirectly hinged in proximity to an edge of said access opening;
- a printing mechanism housed in said containment shell and comprising at least one paper pressing roller which is positioned in proximity to said paper output opening or slot and held in said position through reversible constraint means;
- a mechanism for releasing said paper pressing roller;
- and wherein said reversible constraint means of the paper pressing roller are substantially configured as a fork for the insertion of the rotation pin of the roller itself, and wherein the insertion/extraction of said pin in/from said constraint means is obtained by translating said roller in a direction which here below is referred to as exit direction and which lies on a plane here below referred to as exit plane;

and wherein said release mechanism is configured in such a way as to exert a force parallel to said exit direction on said roller.

In a practical embodiment, said release mechanism exerts a thrusting force on said roller, in such a way as to push it out of the constraint means.

For example, said release mechanism comprises at least one arm in turn comprising a release button at a first end and means constraining said arm to said paper pressing roller at the opposite end.

Said arm constraining means comprise, for example, a fork in which the rotation pin of said paper pressing roller is inserted.

Said arm is arranged inside said shell, preferably in a position close to said access opening of the shell and to said cover when this is in the closed position.

In particular, said arm is arranged substantially orthogonal to the rotation axis of the cover, parallel and close to the cover when this is in the closed position.

Said at least one arm is constrained in such a way as to make it slide in said exit direction with respect to said cover when a user acts on said release button.

Acting on said release button makes said arm exert a thrusting force on said roller in said exit direction, which causes said paper pressing roller to be released from said constraining means.

In the preferred solution, said at least one arm is furthermore constrained to said cover in such a way that only the relative sliding movement between arm and cover is allowed, and furthermore it is constrained to said containment shell in a reversible manner, so as to prevent the undesired rotation of the cover, that is, its opening.

When said release button is pressed, said arm slides and is released from the shell, thus allowing the cover to rotate, that is, to open, once said paper pressing roller has been released.

The new handheld multifunction electronic device integrating said printer is of the type comprising the following in a single box-shaped body: at least one display, at least one CPU, at least one operating memory, at least one data input interface and said at least one integrated printer of the type described above.

Said printer can be usefully employed for printing orders and/or other non-fiscal documents and/or for printing fiscal receipts, in which case said printer is programmed, in a way that cannot be modified by the user, to respect a given format for the receipt, meaning the dimensions, the font and the specified data, to apply the cash register serial number, if any, to register the transaction in the MMC (a fiscal memory device, called "DGFE" in Italian), and to print the wording "NO FISCAL VALUE" if other types of documents are issued.

The new handheld electronic device is particularly suited to be used as a normal PC or electronic processor for the management of electronic payments (cashless) and also as a cash register.

For this purpose, the printer conveniently comprises also at least one housing provided with an interface for a MMC for the storage of the fiscal data related to the sales documents which have been issued.

Said housing with interface for a MMC can be, for example, usefully located inside the printer, in a compartment which can be accessed by the operator and is not protected by any anti-tampering fiscal seal.

Otherwise, said housing can be located inside the printer casing and protected by a suitable anti-tampering fiscal seal, especially in the case of cash registers that also serve for the electronic transmission of receipts.

The printer, if it is a fiscal printer, preferably comprises also at least one inalterable fiscal memory and the related housing inside an integrated case which cannot be accessed from the outside of the device, said fiscal memory being constrained inside said case in a removable manner, and wherein said case can be opened only after breaking the physical fiscal seal, for example a destroyable adhesive label applied to protect the screw closing the case of the new device, or after violating the electronic fiscal seal, for example a sensor which detects when the case is opened and cancels the internal memory.

In a particularly effective solution, the new device comprises two displays, of which a first display suited to display data towards the user and a second display suited to display data towards the customer, and wherein said first display and said second display are mutually arranged in such a way that they are visible and accessible when the user and the customer are in front of each other and the new electronic device is held between said user and said customer. In this situation, the first display is suited to display the data in such a way that it can be directly read by the user while the second display is suited to display the data in such a way that it can be directly read by the customer.

Said first display and said second display are preferably arranged on two planes which are inclined with respect to each other, wherein the mutual inclination of said two displays is preferably fixed and predefined.

Said display is positioned on the opening cover of the printer.

Said printer is installed in such a way that said paper output slot is positioned between said first display and said second display.

According to a practical application of the new device, the user identifies the purchased items and inserts them in the purchase list, after which said items appear on the first display.

When the order is entered, said purchase list can be displayed also on the second display or on a portion of the first display, so that the customer can check it at the same time as the user and with no need for the user to hand the new device to the customer or for the user and the customer to stand side by side.

According to the invention, said second display can also display other data and information of various types.

Once the purchase has been confirmed, the receipt printing procedure is started, and the receipt can also be of the fiscal type, in which case during the printing process the item list, the partial amounts and the total amount are simultaneously displayed on the second display or on a portion of the first display, and also printed on the receipt.

Thus, said list with the partial amounts and the total amount can be displayed on both displays or, in any case, at least on the first display.

In the case of an electronic payment (cashless) the second display shows the instructions for the customer, who can pay with a credit card or a debit card by simply placing it near the second display or inserting it in the microchip reader or swiping it in the magnetic reader, according to the supported technology. The customer can also pay with a contactless device, for example based on NFC technology, by simply bringing it near the second display.

The new device can also comprise at least one touch panel or touch screen, which can be separate from each data display or completely or partially superimposed to each one of said displays, so that the customer can enter his/her PIN or sign while remaining in front of the user who is operating the device.

Said touch panel, for example, is useful for payment procedures or other procedures that require a normal or electronic signature or for entering a personal identification number (PIN).

As an alternative to or in combination with the above, the new device may also comprise a keyboard for entering the PIN.

Said touch function of the two displays can be activated when necessary or be always active.

According to the invention, it is also possible but not necessary to provide the second display, which faces towards the customer, with a film or treatment or layer suited to allow said second display to be viewed only from the front position and not from a lateral position. As an alternative, said second display can be surrounded by a special raised frame which prevents the side view of any data displayed and/or entered on the touch screen of the second display.

The new device thus makes it possible to implement many applications, for example including but not limited to the following: operations for door to door sales, itinerant sales, sales on means of transport, for example on airplanes, catering activities on trains, issuing of fines, management of parking lots, portable ticket offices, ticket checking activities, meter reading, transportation of valuables, technical assistance at customers' premises, express couriers and mailing and delivery services in general, warehouse logistics, health services, accommodation and food services, municipal services in general.

The characteristics of the present invention are highlighted in greater detail in the following description, with reference to the drawings which are attached hereto by way of non-limiting example.

FIG. 2 shows a three-dimensional view of the printer (S) only, while

Figure 1:
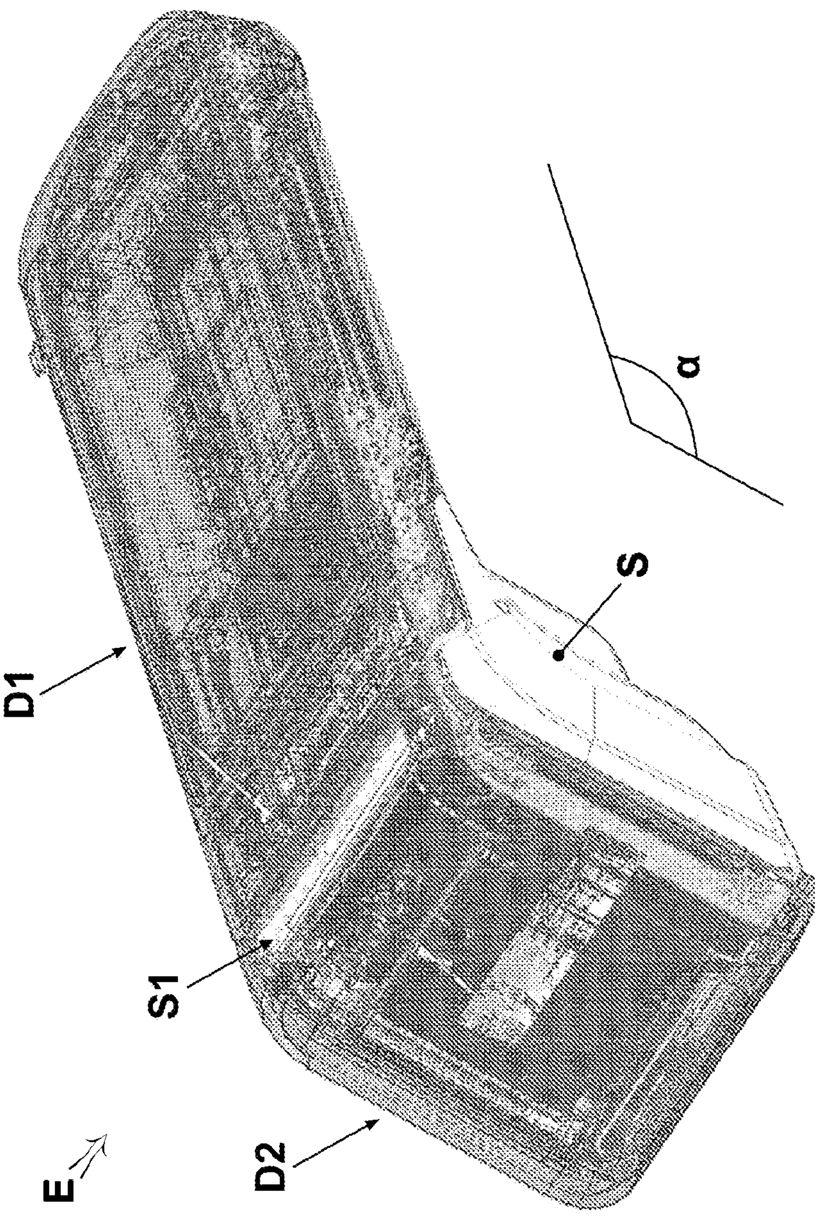
FIG. 1 shows a three-dimensional view of the upper part of a handheld multifunction device (E) in the special but non-limiting solution with two displays (D1, D2) and an integrated printer (S).
Figure 3:
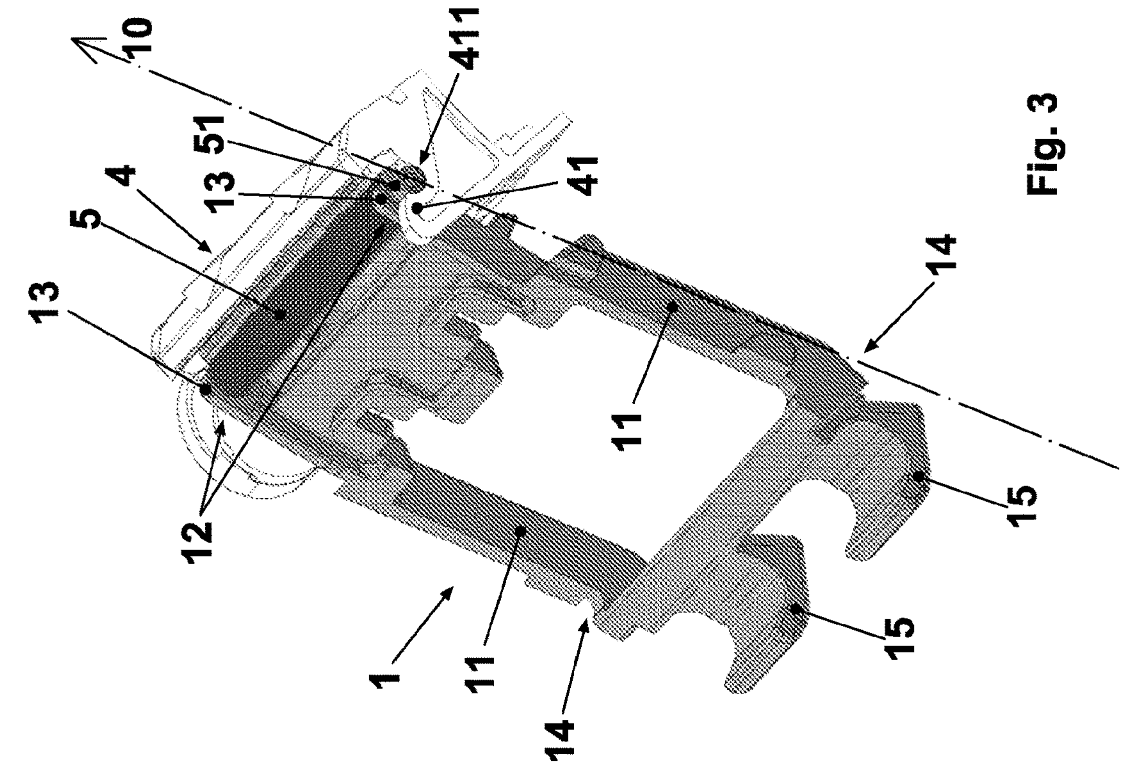
FIG. 3 shows some of the internal components of said printer (S) and in particular the printing mechanism (4), the paper pressing roller (5) and the release mechanism (1) for releasing said paper pressing roller (5).
Figure 2:
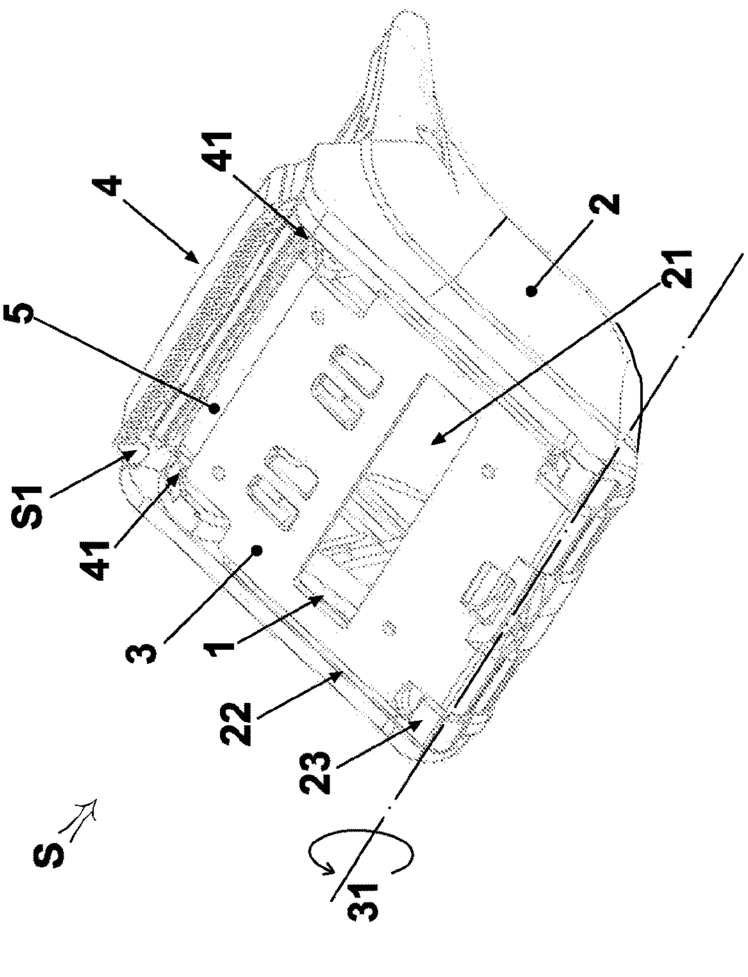

The invention concerns a handheld multifunction electronic device (E) comprising, in a single box-shaped body, a first display (D1), a second display (D2), at least one CPU, at least one operating memory.

Said first display (D1) is suited to display data towards the user.

Said second display (D2) is suited to display data towards the customer.

Said first display (D1) and said second display (D2) are mutually arranged in such a way that they can be viewed and accessed when the user and the customer are in front of each other and the new electronic device (E) is held between said user and said customer.

More specifically, the second display (D2) is inclined with respect to the plane of the first display (D1).

The angle ($\alpha$) included between said first display (D1) and said second display (D2) preferably ranges between 90 degrees and 180 degrees.

Each of said two displays (D1, D2) comprises a superimposed touch panel or touch screen.

The new device may also comprise a magnetic stripe card reader, a chip card reader, a contactless card reader.

The new electronic device (E) furthermore comprises a printer (S) of the clamshell type, suited to print bills, receipts, invoices or similar documents.

In this example said printer (S) is arranged in the lower part of the new device (E) between said first display (D1) and said second display (D2), and comprises a slot or opening (S1) designed for the output of the printed sheet and positioned between said two displays (D1, D2), in such a way that the sheet comes out facing upwards with respect to the normal position of use of the device (E).

On the other hand, according to the invention, if the printer (S) is installed in such a way that the sheet comes out of the lower part of the device (E), the latter may comprise at least one sensor or an accelerometer, in such a way as to determine whether it has been placed on a surface and consequently stop the printer from ejecting the printed sheet until the new device (E) is lifted and/or overturned.

According to the invention, said device (E) may comprise also a POS payment module, in turn comprising a body containing said second display (D2), possibly a touch screen superimposed to said display (D2), possibly an internal RFID antenna for contactless payments, possibly a side opening for the insertion of contact smart cards, possibly a magnetic head for reading magnetic cards, any warning LEDs on the front, in proximity to the display (D2).

FIG. 5 shows an example of use of the new electronic device (E), in which the user (Y) holds said new device (E) with the first display (D1) facing towards himself/herself and at the same time hands the new device to the customer (X) with the second display (D2) facing towards the same customer (X).

The printer (S) that is the subject of the present invention can be of the type suited to be integrated in a handheld electronic device as described above or can be of the stand-alone type: the inventive concept remains substantially the same.

The main parts of the new printer (S) include a containment shell (2) inside which the following is defined: a compartment (21) suited to house at least one paper roll that is not shown in the figures, an opening (22) for accessing said paper compartment (21), a paper output opening or slot (S1).

Said opening (22) for accessing the paper compartment (21) is provided with a closing cover (3) which is directly or indirectly hinged in proximity to an edge (23) of said opening (22). Said cover (3) can thus be rotated around an axis (31).

The inside of said shell (2) houses a printing mechanism (4) comprising at least one paper pressing roller (5) positioned in proximity to said paper output opening or slot (S1) and held in said position through reversible constraint means (41).

Said reversible constraint means (41) comprise, for example, fork-shaped seats in which the rotation pin (51) of the roller (5) is engaged.

Conveniently, both of the opposite ends of the rotation pin (51) are inserted in two seats (411) configured so that the extraction and the insertion of said rotation pin (51) of the roller (5) are carried out by translating said roller (5) in an exit direction (10) lying on an exit plane.

The new printer (S) comprises also a mechanism (1) for releasing said paper pressing roller (5), wherein said release mechanism (1) is configured to exert a force parallel to said exit direction (10) on said roller.

In the embodiment represented in the figures, said release mechanism (1) comprises at least one arm (11), preferably two arms, each preferably positioned in proximity to one side of said access opening (22) of the shell (2), in such a way as not to hinder access to the paper compartment (21), and in proximity to one side (32) of said cover (3). More specifically, said at least one arm (11) is positioned orthogonally to the rotation axis (31) of the cover (3), parallel and close to the cover (3).

One end (12) of said arm (11) is constrained to said paper pressing roller (5), for example through a fork (13) inside which the rotation pin (51) of said paper pressing roller (5) is inserted.

At the opposite end (14) of said arm (11) there is a release button (15) that can be accessed from the outside of the shell (2), being positioned, for example, in proximity to the rotation axis (31) of the cover (3).

Said at least one arm (11) is constrained so that it slides in said exit direction (10) with respect to said cover (3), when the same cover (3) is closed and when a user acts on said release button (15).

Figure 4:
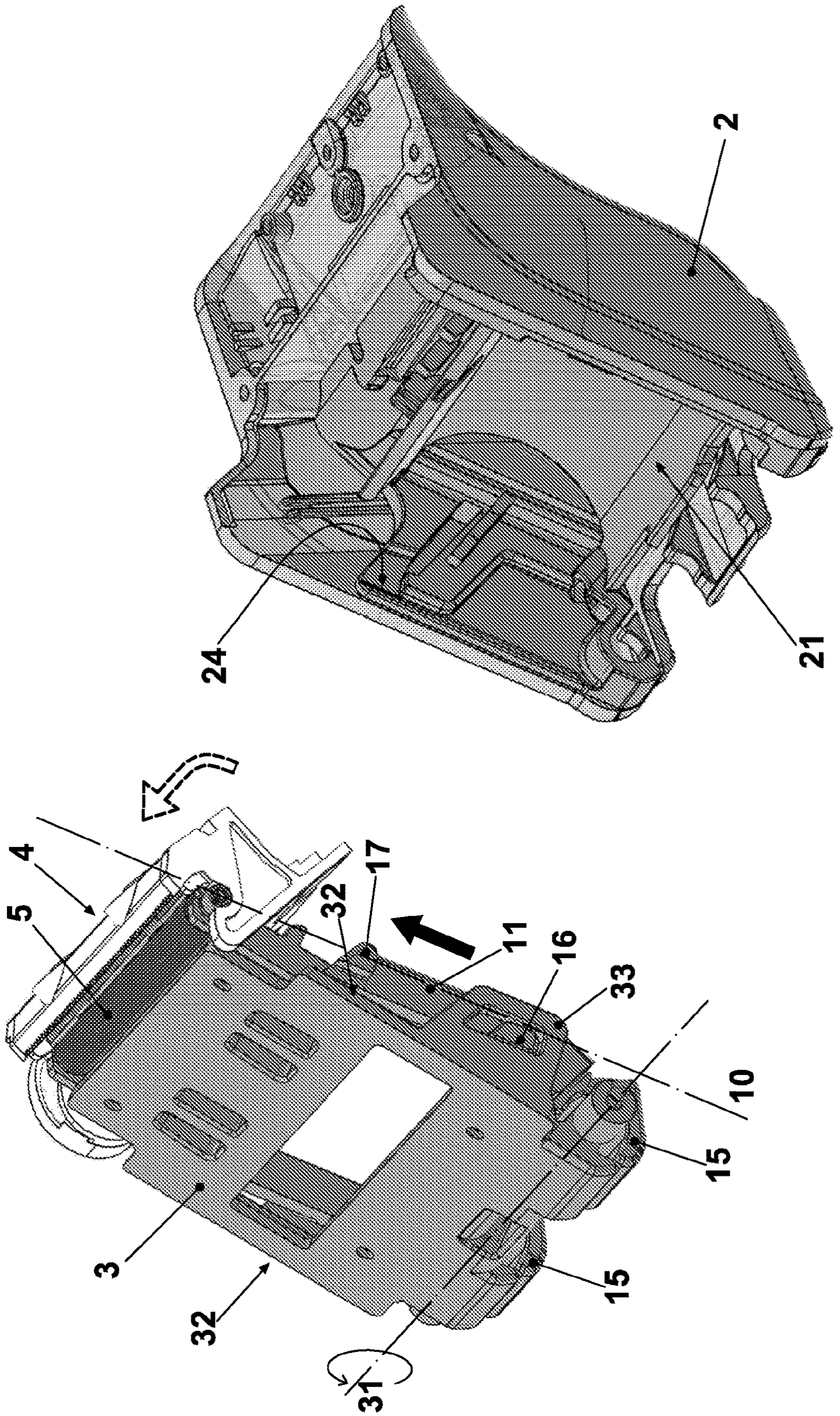
FIG. 4 shows a partial exploded view of the printer (S), where in addition to the components shown in FIG. 3, it is possible to observe also the containment shell (2) and the cover (3) mounted on the release mechanism (1).

In particular, as can be seen in the detail of FIG. 4, said at least one arm (11) comprises at least one projection (16) inserted in a sliding way in a corresponding seat (33) that is integral with the cover (3) and oriented parallel to said exit direction (10) which lies on a plane close to said cover (3).

When said release button (15) is activated, said arm (11) is translated with respect to said closed cover (3) from a first backward locked position to a second forward release position along said exit direction (10) (indicated by the black arrow in FIG. 4), wherein the translation of the arm (11) pushes the paper pressing roller (5) out of said constraining means (41) of the printing mechanism (4).

Said roller (5) thus follows the trajectory schematically indicated by the arrow drawn in a broken line in FIG. 4, meaning that it comes out of said constraining means (41) translating in said exit direction (10) and then moves upwards.

In the preferred solution, said at least one arm (11) is furthermore constrained to said containment shell (2) in a reversible manner, in such a way as to prevent the undesired rotation of the cover (3), that is, its opening, until said release button (15) is pressed. For example, said arm (11) comprises at least one lateral projection (17) configured in such a way as to become fixed in a corresponding seat (24) created in the shell (2) when said arm (11) is in said backward locked position.

In this position, therefore, said arm (11) constrains the cover (3) to the shell (2), preventing it from opening.

When said release button (15) is pressed and said arm (11) is moved in said forward release position, said projection (17) moves out of the seat (24) created in the shell (2) and releases the cover (3) which thus can be rotated and opened once said paper pressing roller (5) has been released.

According to the invention, to guarantee that a symmetrical action is exerted on said roller (5) said release mechanism (1) preferably comprises two of said release buttons (15) and two of said arms (11) acting symmetrically on both ends of said rotation pin (51) of the roller (5) in said exit direction (10).

According to the invention, a display (D2) can be installed on the outside of said cover (3), for example said second display (D2) of the device (E) described above. These are the schematic outlines which are sufficient for the expert in the art to carry out the invention, consequently, in the practical application process variants can be developed which do not affect the substance of the innovative concept introduced herein.

Therefore, with reference to the description provided above and to the attached drawings, the following claims are expressed.

The invention claimed is:

1. A portable thermal printer (S) comprising:

a containment shell (2) having therein:

a compartment (21) configured to accommodate a roll of paper, an access opening (22) designed to allow said compartment (21) to be accessed, and a paper output opening or slot (S1);

a cover (3) configured to close said access opening (22), directly or indirectly hinged to said containment shell (2) and to rotate around a rotation axis (31) from a closed position to an open position;

a printing mechanism (4) housed in said containment shell (2) and comprising a paper pressing roller (5) positioned adjacently to said paper output opening or slot (S1) and held in that position through a reversible constraint member (41);

a release mechanism (1) configured to release said paper pressing roller (5);

wherein said reversible constraint member (41) is configured to engage a rotation pin (51) of the paper pressing roller, wherein an insertion/extraction of said rotation pin (51) in/from said constraint member (41) is performed by translating said paper pressing roller (5) according to an exit direction (10) lying on an exit plane, wherein said release mechanism (1) is configured to exert a force on said paper pressing roller (5) according to a direction which is parallel to said exit direction (10), wherein said release mechanism (1) comprises an arm (11), one end (12) of said arm (11) being constrained to said paper pressing roller (5), a release button (15), accessible from outside of the containment shell (2) and positioned in adjacently to said rotation axis (31) of said cover (3), is connected to an opposite end (14) of said arm (11), leaving an external area of said cover (3) free, wherein said arm (11) is constrained so that said arm slides with respect to said cover (3), when said cover (3) is closed and when a user acts on said release button (15), between a first backward locking position and a second forward release position, along said exit direction (10), and wherein sliding movement of said arm (11) pushes said paper pressing roller (5) in said exit direction (10), extracting said paper pressing roller from said constraint member (41).

2. The portable thermal printer (S) according to claim 1, wherein said arm (11) comprises at least one projection (16) slidingly inserted in a corresponding seat (33) which is integral with the cover (3) and oriented along said exit direction (10).

3. The portable thermal printer according to claim 2, wherein said arm (11) comprises one or more reversible constraint means (17) configured to reversibly constrain said arm (11) to said containment shell (2).

4. The portable thermal printer according to claim 1, wherein said arm (11) comprises a projection (17) configured to become fixed into a corresponding seat (24) obtained in the containment shell (2) when said arm (11) is in said backward locking position, thus constraining the cover (3) to the containment shell (2), and wherein in said forward release position said projection (17) moves out of the corresponding seat (24) provided in said containment shell (2) and releases the cover (3).

5. The portable thermal printer (S) according to claim 1, wherein said portable thermal printer is of a stand-alone type.

6. The portable thermal printer (S) according to claim 1, wherein said portable thermal printer is configured to be integrated in a handheld electronic device (E).

7. The portable thermal printer (S) according to claim 1, wherein said portable thermal printer comprises at least one display (D2) mounted on said cover (3).

8. A handheld multifunction electronic device (E) comprising, contained in a box-shaped body:

a display (D1);

a CPU;

an operating memory, a data input and display interface; and a portable thermal printer (S) according claim 1, integrated within said box-shaped body or integral with said box-shaped body.

9. The handheld multifunction electronic device (E) according to claim 8, wherein said display (D1), is a first display, further comprising a second display (D2) arranged on a plane which is inclined with respect to a plane on which said first display (D1) lies, wherein said first and said second displays (D1, D2) are correctly visible from two substantially opposite positions, wherein said portable thermal printer (S) is arranged on an underside of the handheld multifunction electronic device (E) between said first display (131) and said second display (D2), and wherein said paper output slot (S1) is positioned between said first and said second display (D1, D2).

10. The handheld multifunction electronic device (E) according to claim 8, further comprising at least one POS module for making payments.

* * * * *